May 16, 1933.  W. J. PETER  1,909,071
WATER TRAP FOR OIL DELIVERY SYSTEMS
Filed July 19, 1930  2 Sheets-Sheet 1
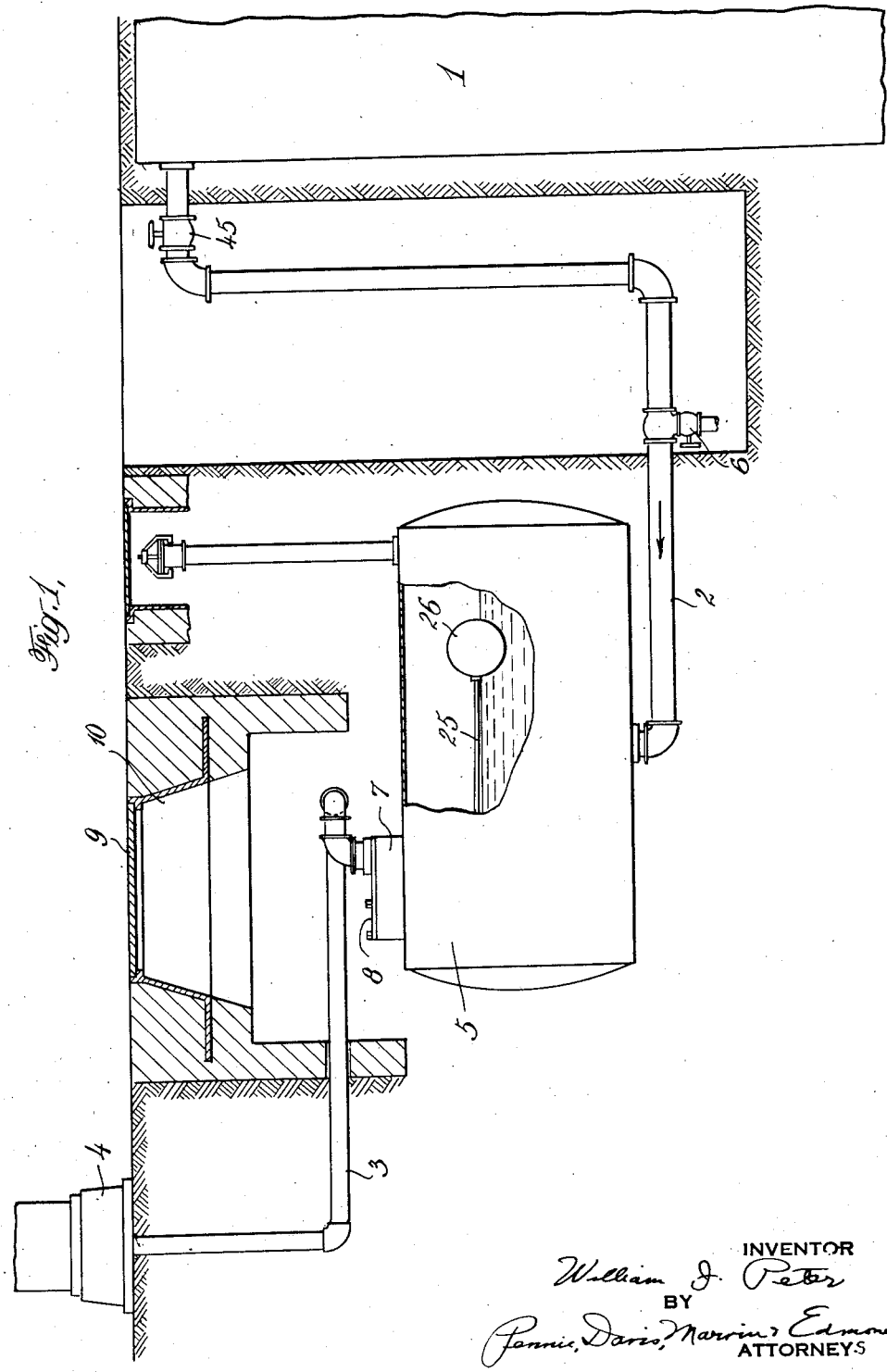
INVENTOR
William J. Peter
BY
Pennie, Davis, Marvin, Edmonds
ATTORNEYS May 16, 1933.   W. J. PETER   1,909,071
WATER TRAP FOR OIL DELIVERY SYSTEMS
Filed July 19, 1930   2 Sheets-Sheet 2
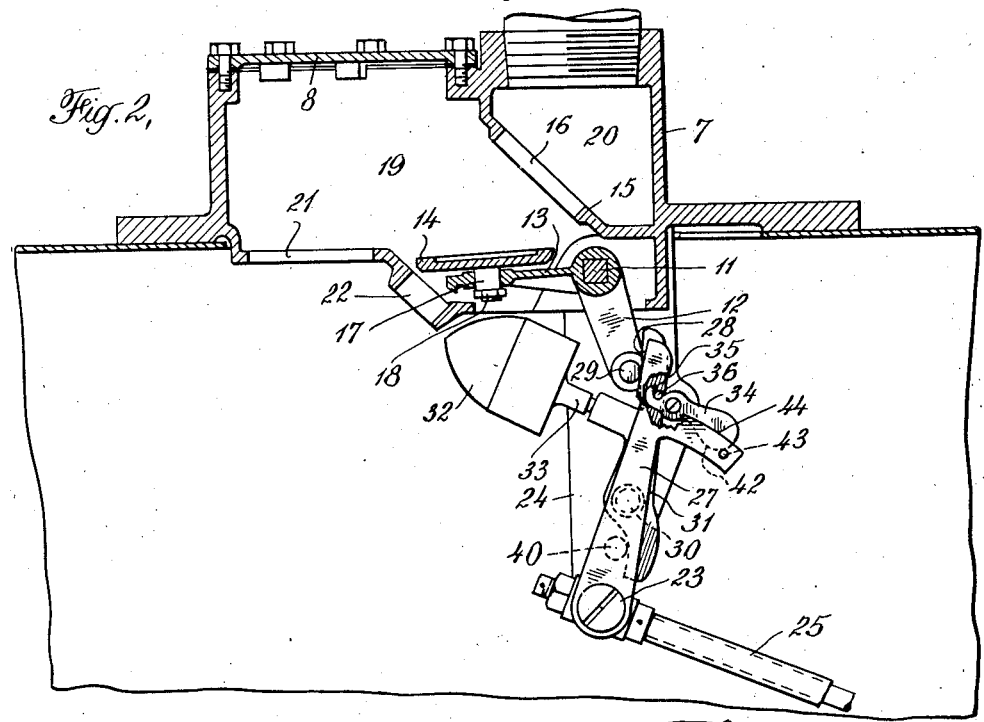
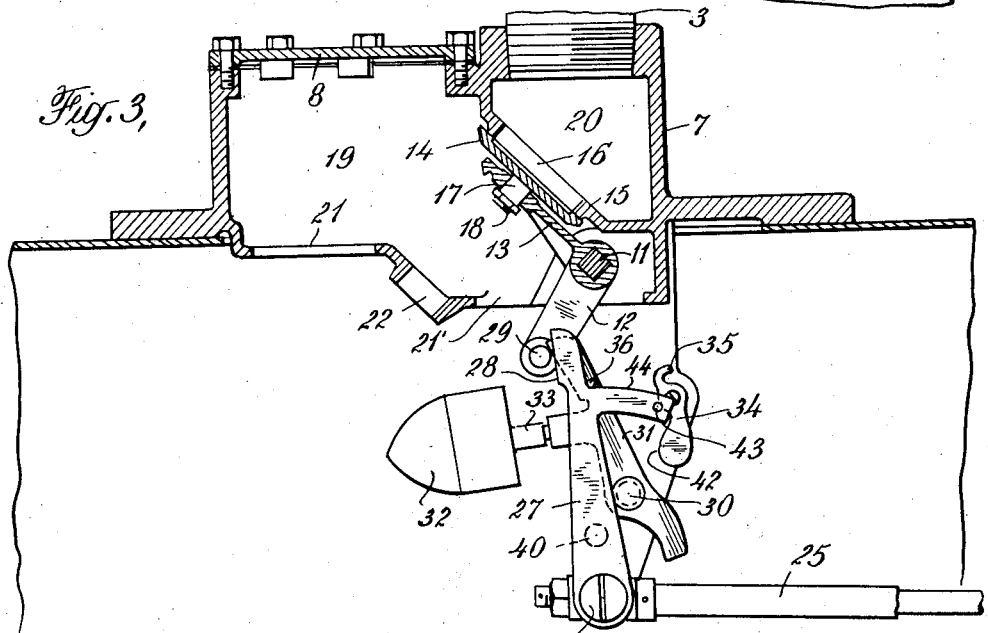
INVENTOR
William J. Peter
BY
Pennie, Davis, Marvin & Edmonds
ATTORNEYS Patented May 16, 1933

1,909,071

UNITED STATES PATENT OFFICE

WILLIAM JOSEPH PETER, OF NEW YORK, N. Y., ASSIGNOR TO AQUA SYSTEMS INCORPORATED, OF NEW YORK, N. Y., A CORPORATION OF NEW YORK

WATER TRAP FOR OIL DELIVERY SYSTEMS

Application filed July 19, 1930. Serial No. 469,245.

This invention relates to systems for storing and delivering fluids lighter than water and immiscible therewith, such as oil. More specifically it aims to provide a trap for interposition within the fluid delivery line to permit gravitational separation of any water which may be carried by the fluid as an impurity, together with a novel form of valve mechanism to positively insure the removal of the accumulated water from the trap when it has attained a predetermined volume.

In one of the common systems of storing and delivering oil a supply of oil is confined within a storage tank, or tanks, usually occupying a position below the ground level and is withdrawn as occasion requires thru a conduit communicating with the tank and extending to a position above the surface to what may be termed the dispensing station where it is removed from the line thru a suitable outlet. Pumps are commonly employed for withdrawing the oil from the storage tank, the intake conduit extending to within a short distance of the bottom of the tank. It frequently happens in practice that minute quantities of water find their way into the oil before it reaches the storage tank, the degree of this contamination varying quite widely depending upon the thoroughness of the refining operation and subsequent degree of careful handling the oil has received in transportation to the storage station. This water separates from the oil and collects in the bottom of the tank whence it enters the intake conduit leading to the pump and is ultimately discharged with the oil. This is always objectionable and, in the case of fuel for internal combustion engines, may have serious consequences, particularly in airplane engines.

In accordance with the present invention this difficulty is overcome by interposing a trap in the pipe line extending from the oil storage tank to the dispensing station to provide a receptacle into which the particles of water carried by the oil may be allowed to settle, mechanism being provided for interrupting the flow of oil thru the trap when the accumulated water reaches a predetermined level. This latter mechanism, more specifically, comprises a normally open check valve permitting free passage of oil thru the trap but having control means adapted to be released by the action of a float for instantly permitting the valve to seat under the influence of a weight to obstruct such passage. In order to positively insure evacuation of the trap after it has been filled with water, and to encourage investigation of the cause of water in the oil line, the valve mechanism is designed so as to necessitate manual resetting; thus the valve once operated to close the passage thru the trap cannot be released to open this passage and allow resumption of service until the trap has been emptied and access had to its interior, thru a removable cover plate, to manually recondition the valve mechanism for another operation.

The invention will be better understood by a consideration of the preferred embodiment illustrated in the accompanying drawings in which:

Fig. 1 is a diagrammatic elevation of an oil delivery system showing the relative arrangement of the trap and valve mechanism of the present invention;

Fig. 2 is a side elevation of the valve mechanism contained within the trap, the valve being shown in its normally open position in which communication exists between the delivery conduit and the trap; and Fig. 3 shows the valve mechanism with the valve occupying its closed position in which communication between the delivery conduit and trap is interrupted.

The embodiment of the invention illustrated consists generally of an oil storage tank 1 located in a pit below ground level, a pipe line constituted by two conduits 2, 3 communicating with the storage tank and leading to an outlet or dispensing station above ground, a service pump 4, conventionally shown, for withdrawing oil from the storage tank 1 thru the pipe line, and a trap 5, comprising a small auxiliary tank in circuit with the pipe line for providing a chamber into which water impurities accompanying the oil may settle. The trap 5 is connected with the storage tank 1 by the conduit 2 entering the bottom of the trap and having a drain cock 6 to permit of emptying the trap. The delivery conduit 3 in turn connects the trap with the dispensing station. In this broad view of the invention the valve mechanism, to be hereinafter described, is considered as a unitary part of the trap. Mounted upon the top of trap 5 is a valve housing 7 having a cover 8 removably fastened thereto by means of bolts for providing access to the interior of the trap. This cover may be reached from the ground level by removing a lid 9 which closes manhole 10.

In order to interrupt communication between the storage tank and the dispensing station when the water accumulating in the trap reaches a predetermined level an automatically actuated valve is provided. As best shown in Figs. 2 and 3 the two opposite parallel side walls of the valve housing 7 provide bearing plates in which is journaled a squared shaft 11 carrying a bell-crank 12 upon one arm 13 of which is mounted a valve 14 adapted to seat upon a plate 15 and close the passage 16 therein. The valve 14 is secured to the bell-crank arm by means of a stud 17 projecting thru the arm and engaged by a nut 18. The plate 15 extends diagonally across one corner of the housing partitioning it into two compartments 19, 20, compartment 19 opening to the interior of the trap thru apertures 21, 21' and 22, while compartment 20 is in communication with the delivery conduit 3. Thus when the valve 14 is seated so as to close the passage in plate 15 the path of the liquid is intercepted and its flow arrested.

The operation of the valve 14 is controlled by the following mechanism: Arranged near the top of the trap and adjacent the valve housing 7 is a stud shaft 23 rotatably mounted upon a bracket 24 formed by an extension of one side wall of the housing 7 projecting vertically downward into the interior of the trap. Fixedly connected to this shaft is a stem 25 carrying at one end a float 26 which is of such a density as to sink in oil and float in water. An arm 27 is rigidly attached to and arranged to rock upon shaft 23, this arm being provided with a bearing face 28 which rubs against a pin 29 carried by one arm of the bell-crank 12 to rotate the bell-crank in a clockwise direction. Fulcrumed upon a pivot 30 carried by the bracket 24 is a finger 31 arranged so that one of its ends is continually pressed against pin 29 on bell-crank 12 by reason of a weight or counterpoise 32 carried by a lateral extension 33 on the finger in such manner as to unbalance the finger and rotate it in a counterclockwise direction. The extension 33 is threadedly connected to the finger 31 and may be screwed in or out to vary the lever arm. The finger however is prevented from turning by reason of a latch 34 pivoted to bracket 24 and having a hook 35 engaging a projection 36 on the finger. Thus the hook 35 latching with projection 36 restrains movement of finger 31 against the urge of weight 32. An abutment 40 on arm 27 limits the rotative movement of finger 31 in the reverse direction. The opposite end of latch 34 is enlarged to form a trigger 41 of sufficient weight to maintain the latch, when free, in a generally upright position with the hook 35 out of engagement with the projection 36, this trigger being so shaped as to provide a cam surface 42 arranged to cooperate with a lug 43 projecting from an extension 44 on arm 27. The arrangement is such that movement of the arm 27 in a counter-clockwise direction causes the lug 43 to engage the cam surface 42 of the trigger 40 and tip the latch in a counter-clockwise direction. This depresses the hook 35 releasing projection 36 which permits the finger 31, responding to the influence of weight 32, to snap forwardly against pin 29 the effect of which will be to rock the bell crank 12 to seat the valve 14 upon plate 15 closing the passage 16. In order to disconnect the storage tank 1 from the trap 5 while the trap is being drained a suitable valve 45 is provided in conduit 2.

The operation of this embodiment of the invention is as follows: All oil passing from the storage tank 1 to the discharge outlet or dispensing station passes through the trap 5, the valve 14 being normally open, and as the liquid within the trap is relatively quiescent, any water carried over by the oil settles so that only clean dry oil reaches the discharge outlet. Should water accumulating in the trap ultimately reach the float 26, the latter is buoyed upward and rocks the shaft 23 carrying the arm 27 in a counter-clockwise direction. Movement of arm 27 in turn presses the lug 43 against the cam surface 42 of trigger 41 to slide the hook 35 out of engagement with the projection 36 allowing the finger 31 to instantly respond to the pull of the weight 32 which rotates it in a clockwise direction. Finger 31 during such movement pushes against the pin 29 on the arm of the bell crank 12 which causes valve 14 to seat with a snap action and to be maintained seated by the weight closing the passage 16. Since communication with the storage tank has been interrupted oil will no longer flow thru the delivery conduit 3 and the operator at the dispensing station will consequently be apprised of the fact that either the oil has been exhausted from the storage tank 1, or the trap 5 has become filled with water, and he has only to ascertain by inspection which of these two conditions exists. Since communication with the storage tank cannot be re-established until the valve 14 is returned to inoperative position his next step will be to close communication between the storage tank 1 and the trap 5 by means of the valve 45 and then open cock 6 to allow the water within the trap and conduit 2 to drain until these parts are completely cleared. After this he may enter manhole 10, remove the cover 8 of the valve housing 7 and, by engaging the latch 34 with the projection 36, recondition the valve mechanism for further operation. Because of the fact that the valve 13 when once seated is, in effect, locked in that position and cannot be reopened except by raising the weight 32, there is no possibility that the operator may disregard the warning and proceed to deliver oil after the water accumulation in the trap has reached the danger level.

It will be understood that, notwithstanding the fact that the arm 27 will assume its retracted inoperative position at the time the trap is drained which permits float 26 to lower, nevertheless the valve 14 will remain closed until the counterpoise 32 has been lifted to move the finger 31 rearwardly for the purpose of engaging it with the latch. Connection between the trap and storage tank can then be re-established and the system is in condition to resume service.

By the above construction, before the quantity of water collected in the line has attained a dangerous limit—that is before the accumulated volume of water has become so great as to render it likely that the oil delivered by the pump will be contaminated by an excessive content of moisture—the line is automatically closed and service cannot be resumed until the water has been removed from the trap.

The system just described is of course not limited to the delivery of oils (which term is used to include gasoline, kerosene and other liquid hydrocarbons) but it may be employed in connection with the delivery of any fluids which are of a different specific gravity from and immiscible with water. Although the present invention will doubtless find its greatest usefulness in connection with pump operated systems, it is not limited to them. It can also be used in connection with gravity, air pressure, and hydraulic systems. Although there is little danger of water contamination in a hydraulic system, nevertheless, the use of my trap with such a system would act as an additional safeguard and serve to prevent any possibility of water passing to discharge.

What I claim is:

1. In an oil storage and delivery system in which oil is transferred from a storage tank to a supply station through a discharge line, a water trap interposed in and forming a part of the discharge line comprising a closed receptacle, a normally-open valve in the discharge line, means for automatically closing the valve when a certain volume of water has accumulated in the trap and means for holding the valve closed until manually reset even through the water may be drained from the trap.

2. In an oil storage and delivery system in which oil is transferred from a storage tank to a supply station through a discharge line, a water trap interposed in and forming a part of the discharge line comprising a closed receptacle, a normally-open valve in the discharge line, means for automatically closing the valve when a certain volume of water has accumulated in the trap, means for holding the valve closed until manually reset, a latch for preventing operation of said automatic closing means and a float adapted to be buoyed up by the water for releasing the latch.

3. In an oil storage and delivery system in which oil is transferred from a storage tank to a supply station through a discharge line, a water trap interposed in and forming a part of the discharge line comprising a closed receptacle, a normally-open valve in the discharge line, means for automatically closing the valve when a certain volume of water has accumulated in the trap and means for holding the valve closed until manually reset, said holding means comprising a counterpoise connected to the valve.

4. In an oil storage and delivery system in which oil is transferred from a storage tank to a supply station through a discharge line, a water trap interposed in and forming a part of the discharge line comprising a closed receptacle, a valve in the discharge line adapted to be moved from open to closed position, means for constraining the valve to closed position, a latch for maintaining said constraining means inoperative and means for automatically releasing the latch when a certain volume of water has accumulated in the trap.

5. In an oil storage and delivery system in which oil is transferred from a storage tank to a supply station through a discharge line, a water trap interposed in and forming a part of the discharge line comprising a closed receptacle, a valve in the discharge line adapted to be moved from open to closed position, means for constraining the valve to closed position, a latch for maintaining said constraining means inoperative, a float designed to sink in oil but adapted to be buoyed upwardly to automatically release the latch when a certain volume of water has accumulated in the trap, and means for draining the trap.

6. In an oil storage and delivery system in which oil is transferred from a storage tank to a supply station through a discharge line, a water trap interposed in and forming a part of the discharge line comprising a closed receptacle, a valve in the discharge line adapted to be moved from open to closed position, means for constraining the valve to closed position, a latch for maintaining said constraining means in operative, means for automatically releasing the latch when a certain volume of water has accumulated in the trap, and a removable cover for the water trap providing access to its interior.

7. In an oil storage and delivery system in which oil is transferred from a storage tank to a supply station through a discharge line, a water trap interposed in and forming a part of the discharge line comprising a closed receptacle, a valve in the discharge line adapted to be moved from open to closed position, means for constraining the valve to closed position, a latch for holding the constraining means against operation, an oscillatable arm arranged to engage and trip said latch, and a float adapted to be buoyed upwardly to oscillate said arm when a certain volume of water has accumulated in the trap.

8. In an oil storage and delivery system in which oil is transferred from a storage tank to a supply station through a discharge line, a water trap interposed in and forming a part of the discharge line, a valve in the discharge line mounted upon a bell crank and movable from open to closed position, means for rotating said bell crank comprising a shaft, a finger on said shaft, means tending to rotate the shaft to engage said finger with one arm of the bell crank, a latch for preventing such rotation, and means for automatically releasing said latch when a certain volume of water has accumulated in the trap.

9. In an oil storage and delivery system in which oil is transferred from a storage tank to a supply station through a discharge line, a water trap interposed in and forming a part of the discharge line, a valve in the discharge line mounted upon a bell crank and movable from open to closed position, means for rotating said bell crank comprising a pivoted finger on said means tending to rotate the said finger to engage it with one arm of the bell crank, a latch for preventing such rotation, and means for automatically releasing said latch when a certain volume of water has accumulated in the trap, said means comprising a float, an arm arranged to be rocked by the float, and an abutment carried by the arm for disengaging said latch.

10. In an oil storage and delivery system in which oil is transferred from a storage tank to a supply station through a discharge line, a water trap interposed in and forming a part of the discharge line, a valve in the discharge line mounted upon a bell crank and movable from open to closed position, means for rotating said bell crank comprising a pivoted finger, a weight carried by the finger tending to rotate it to engage said finger with one arm of the bell crank, a latch mounted upon a fixed part of the trap and engaging said finger to prevent such rotation, and means for automatically releasing said latch when a certain volume of water has accumulated in the trap, said means comprising a float designed to sink in oil and float in water, an arm arranged to be rocked by the float, an abutment carried by the arm for disengaging said latch, and means for holding said latch when released in inoperative position to insure manual resetting.

11. In an oil storage and delivery system in which oil is transferred from a storage tank to a supply station through a discharge line, a water trap interposed in and forming a part of the discharge line comprising a closed receptacle, a normally-open valve in the discharge line, a float in the trap designed to sink in oil but float in water, means controlled by the float for closing the valve when water in the trap has reached a predetermined level, and means for holding the valve, once closed, in closed position until manually reset, irrespective of the position of the float.

In testimony whereof I affix my signature.

WILLIAM JOSEPH PETER.